(12) United States Patent
Basini

(10) Patent No.: US 11,029,102 B2
(45) Date of Patent: Jun. 8, 2021

(54) HEAT EXCHANGER

(71) Applicant: HS Marston Aerospace Limited, Wolverhampton (GB)

(72) Inventor: Neil Basini, Wolverhampton (GB)

(73) Assignee: HS MARSTON AEROSPACE LIMITED, Wolverhampton (GB)

( * ) Notice: Subject to any disclaimer, the term of this patent is extended or adjusted under 35 U.S.C. 154(b) by 0 days.

(21) Appl. No.: 15/867,929

(22) Filed: Jan. 11, 2018

(65) Prior Publication Data

US 2018/0202727 A1 Jul. 19, 2018

(30) Foreign Application Priority Data

Jan. 13, 2017 (EP) .................................. 17151503.4

(51) Int. Cl.
| | | |
|---|---|---|
| *F28F 13/12* | (2006.01) | |
| *F28F 9/02* | (2006.01) | |
| *F28F 1/00* | (2006.01) | |

(52) U.S. Cl.
CPC ............... *F28F 13/12* (2013.01); *F28F 1/00* (2013.01); *F28F 9/028* (2013.01); *F28F 9/0246* (2013.01); *F28F 9/0268* (2013.01)

(58) Field of Classification Search
CPC ...... F28F 9/00; F28F 9/02; F28F 9/026; F28F 9/0265; F28F 9/0268; F28F 9/028; F28F 9/0282; F28F 9/22; F28F 2009/222; F28F 2009/228; F28F 2225/02; F28F 2250/02; F28F 2009/224; F28F 2009/226
USPC .............................................. 165/109.1, 174
See application file for complete search history.

(56) References Cited

U.S. PATENT DOCUMENTS

| | | | | |
|---|---|---|---|---|
| 673,767 | A * | 5/1901 | Eycleshymer ...... | F28D 1/05333 165/174 |
| 2,602,647 | A * | 7/1952 | Miller ........................ | B01J 8/44 165/109.1 |
| 2,717,049 | A * | 9/1955 | Langford ................ | F16L 55/04 96/377 |
| 2,768,814 | A * | 10/1956 | Frey ...................... | F28F 9/0265 165/139 |
| 4,038,191 | A * | 7/1977 | Davis ..................... | B01D 63/02 210/321.6 |

(Continued)

FOREIGN PATENT DOCUMENTS

| | | |
|---|---|---|
| EP | 0121079 A1 | 10/1984 |
| EP | 2541180 A1 | 1/2013 |

(Continued)

OTHER PUBLICATIONS

EP Search Report; Application No. 17151503.4-1602; dated Oct. 11, 2017; 7 pages.

*Primary Examiner* — Jianying C Atkisson
*Assistant Examiner* — Jose O Class-Quinones
(74) *Attorney, Agent, or Firm* — Cantor Colburn LLP

(57) ABSTRACT

A heat exchanger includes a conduit, a header, and a swirler been formed as a unitary piece by additive manufacturing. The swirler is disposed within the conduit and the header and is arranged to disperse a flow from an inlet flow path a heat exchanger matrix. The swirler extends a only portion of the length of the header between the conduit and the heat exchanger matrix and thereby provides space within the header for fluid to diffuse before entering the heat exchanger matrix.

7 Claims, 5 Drawing Sheets

(56) References Cited

U.S. PATENT DOCUMENTS

| | | | | |
|---|---|---|---|---|
| 4,452,216 A * | 6/1984 | Patchen, II | F02B 29/0462 | 123/545 |
| 4,524,823 A * | 6/1985 | Hummel | F25B 39/028 | 165/174 |
| 5,059,226 A * | 10/1991 | Schneider | F25B 39/028 | 55/459.1 |
| 5,107,924 A * | 4/1992 | Herbert | B29C 45/00 | 165/149 |
| 5,375,653 A * | 12/1994 | Borlinghaus | A23L 2/10 | 165/109.1 |
| 5,531,266 A * | 7/1996 | Ragi | C07C 2/58 | 165/110 |
| 5,625,112 A * | 4/1997 | Ragi | C07C 2/58 | 585/709 |
| 6,786,275 B2 | 9/2004 | Dey et al. | | |
| 7,895,860 B2 * | 3/2011 | Tucker | F25B 39/028 | 62/513 |
| 8,359,744 B2 | 1/2013 | Hislop et al. | | |
| 9,200,855 B2 | 12/2015 | Kington et al. | | |
| 2003/0111210 A1 * | 6/2003 | Tsujita | F28F 1/426 | 165/51 |
| 2005/0142421 A1 * | 6/2005 | Lisgaras | H01M 8/04014 | 429/456 |
| 2006/0174611 A1 | 8/2006 | Dilley | | |
| 2008/0190592 A1 * | 8/2008 | Bruck | F02M 26/32 | 165/159 |
| 2008/0245502 A1 * | 10/2008 | Knaus | F28F 9/0265 | 165/42 |
| 2012/0324859 A1 * | 12/2012 | Foster | F02C 7/224 | 60/39.01 |
| 2013/0025838 A1 * | 1/2013 | Kato | F28D 1/05366 | 165/173 |
| 2014/0000841 A1 * | 1/2014 | Baker | F25B 29/00 | 165/59 |
| 2014/0020864 A1 * | 1/2014 | Wick | F28F 9/0263 | 165/96 |
| 2014/0109857 A1 * | 4/2014 | Vallee | F02B 29/0462 | 123/184.21 |
| 2015/0107804 A1 * | 4/2015 | Glass | F28F 9/0268 | 165/133 |
| 2015/0114611 A1 * | 4/2015 | Morris | F02C 7/10 | 165/166 |
| 2015/0285129 A1 * | 10/2015 | Dziubinschi | F02B 29/0468 | 60/599 |
| 2015/0322898 A1 * | 11/2015 | Chesney | F02M 26/25 | 123/568.12 |
| 2016/0131035 A1 | 5/2016 | Diaz et al. | | |
| 2016/0169000 A1 | 6/2016 | King et al. | | |
| 2016/0231065 A1 | 8/2016 | Kironn et al. | | |
| 2016/0231068 A1 * | 8/2016 | Schmitz | F28F 9/02 | |

FOREIGN PATENT DOCUMENTS

| | | |
|---|---|---|
| JP | 2007224813 A | 9/2007 |
| WO | 2019160290 A1 | 8/2019 |

* cited by examiner

HEAT EXCHANGER

FOREIGN PRIORITY

This application claims priority to European Patent Application No. 17151503.4 filed Jan. 13, 2017, the entire contents of which is incorporated herein by reference.

TECHNICAL FIELD

The invention relates to a header for a heat exchanger, particularly to a header comprising a swirler.

BACKGROUND

Heat exchangers typically comprise a conduit for providing fluid to a heat exchanger matrix. Fluid disperses from the conduit through a header of a flow distributor tank and then through the heat exchanger matrix in order to exchange heat therewith. The header typically comprises a larger volume than the conduit so as to receive fluid flowing from the conduit and allow it to disperse before passing through the heat exchanger matrix. Another fluid may be in thermal communication with the heat exchanger matrix and hence with the fluid from the conduit, in order to exchange heat with the fluid from the conduit.

Typically, the conduit, the header, and the heat exchanger matrix are sized suitably for their intended purpose, ensuring that fluid flowing out of the conduit and into the header travels sufficiently slowly to subsequently disperse throughout the heat exchanger matrix volume. Some heat exchangers have high performance standards that require the conduit to be narrow, and hence contribute to making the fluid flowing through it fast. Such fast fluid flow can prevent the fluid dispersing inside the header and can lead to focussed hotspots on the heat exchanger matrix, thereby reducing the efficiency of the heat exchanger.

One solution to this issue is to make the space within the header suitably large to allow sufficient dispersal of the fluid before reaching the heat exchanger matrix. However, this approach can be impractical given typical system constraints.

SUMMARY

According to a first aspect of the present invention there is provided a heat exchanger comprising: a conduit defining an inlet flow path for a fluid; a header disposed to receive a flow from the inlet flow path; a heat exchanger matrix disposed to receive a flow from the header; and a swirler disposed within the conduit and the header, wherein the swirler is arranged to disperse a flow from the inlet flow path over the heat exchanger matrix; and wherein the conduit, header, and swirler have been formed as a unitary piece by additive manufacturing.

The swirler is therefore integral to both the header and the conduit, so that structurally distinct material interfaces do not exist between the swirler and the header, or the swirler and conduit. The swirler thus extends from the conduit into the space inside the header, and directs fluid flowing through the conduit and the header. The conduit, header and swirler have been formed as a unitary piece, for example as one single integral part and/or all integrally connected together. This unitary piece has an internal structure as formed by additive manufacturing techniques and thus can be distinguished from components formed by other manufacturing techniques such as casting or machining.

Typical joins between components can be prone to focussing forces and stresses therein as a consequence of the operating environment and high speed fluid flow, leading to wear and degradation, and ultimately failure, of the heat exchanger. The unitary nature of the swirler, conduit and header means that the interface between these parts (e.g. between the header and the conduit, the swirler and conduit, etc.) are less likely to suffer from such degradation. The joins between the different sections that form the swirler, conduit and header are formed by additive manufacturing along with the swirler, conduit and header and thus the joins also have an internal structure as formed by additive manufacturing techniques, which can be distinguished from joins formed by other techniques. The use of additive manufacturing also permits complex shapes to be formed. In particular the shape of the swirler, as discussed below, can be formed integrally with the conduit and header without the difficulties that would arise from forming the same shapes via other means.

Further, because of the large interior spaces in headers, they cannot easily be formed using additive manufacturing because they will collapse during formation. In the present invention however, the swirler is formed in a unitary piece along with the header and is disposed therein. The swirler thereby provides support during formation so that the header may be more easily formed by additive manufacturing, benefiting from the advantages of the manufacturing technique.

The conduit may be arranged to receive high speed fluid flow and/or high volumes of fluid flow, and design constraints may not permit widening of the conduit to decrease the fluid flow speed, or making the header larger. Hence, a swirler is provided in the conduit and the header according to the present invention, and this may allow suitable distribution of the flow even for higher flow speeds.

Formation of the header together with the conduit and the swirler makes the component unitary and so reduces the likelihood of structural discontinuities at any interfaces between any of the conduit, the header, and the swirler. Thus, concentrations of forces in these regions may be avoided, reducing the likelihood of deformation of the heat exchanger and/or increased wear and degradation, microfractures, and leakage.

The swirler may be arranged to provide structural support to the header, so that the header is supported during manufacture by an additive manufacturing technique. The swirler may also provide support to the header during use, preventing deformation that may lead to component wear and degradation, e.g. during repeated transitions of the heat exchanger between temperatures.

The heat exchanger may have been formed as a unitary piece by additive manufacturing. That is, the entire heat exchanger may have been formed by additive manufacturing, so that the heat exchanger matrix may have been formed by additive manufacturing together with the conduit, swirler and header. Such techniques may include forming different portions of the heat exchanger—the conduit, the swirler, the header, and the heat exchanger matrix—sequentially or simultaneously. The heat exchanger as a whole may therefore be a unitary component.

The portion of the swirler within the header may extend across the entire width of the header. Thus, the swirler may bridge the space between opposing walls of the header, and join integrally with those walls so as to be formed as a single piece. The swirler may extend across the entire width of the header in two dimensions. For example, in the case of a header with a substantially square cross section, the swirler may bridge between both sets of opposing walls of the header. The cross section may take any suitable shape. The swirler may therefore provide increased support to the header in a plurality of dimensions. The swirler may extend the entire length of the header, so that it extends from the inlet fluid path to the heat exchanger matrix, thereby providing support to the header along its entire length, and/or directing fluid flow along its entire length. Alternatively, the swirler may extend a portion of the length of the header between the conduit and the heat exchanger matrix, providing sufficient support while also allowing space within the header for fluid to diffuse before entering the heat exchanger.

The portion of the swirler within the header may extend across the entire width of the heat exchanger matrix. It may extend across the entire width of the heat exchanger in two dimensions. Thus, the header and the heat exchanger matrix may have substantially the same cross-sections, and the swirler may serve to direct fluid over substantially the entire cross section of the heat exchanger matrix.

The swirler may divide the header into a plurality of equal volumes. The regions of space within the header separated by the swirler may be substantially the same volume and/or may have substantially the same cross-section proximate the heat exchanger matrix, so that fluid flow is directed equally over the heat exchanger matrix between regions of the header. Alternatively, the swirler may divide the header into unequal volumes and/or cross sections so that some regions of the heat exchanger matrix receive different amounts of fluid flow to others.

The swirler may comprise a plurality of curved blades arranged to direct a flow of fluid through the inlet flow path and the header. The curved blades may extend away from the header into the conduit, and may extend away from the conduit into the header. The curved blades may have a substantially constant curvature along their length. Alternatively, the blades may have a changing pitch as they extend away from the conduit. That is, the blades may have an increase or a decrease in pitch along their length.

The blades may be smooth between the conduit and the header. Thus, fluid flowing over the blades may be redirected smoothly, and material stresses may not accumulate in regions of the blades. That is, the blades may not provide a turbulent surface for fluid passing thereover, through the inlet flow path and into and through the header. The swirler may have a constant geometry along its length within the envelope defined by the conduit and the header.

The swirler blades may curve through 90 degrees along their entire length, so that one end of the swirler is oriented at 90 degrees to the other. The upstream and downstream ends of the swirler may be in planes perpendicular to the fluid flow direction.

The swirler may be arranged to complement the shape of a cross section of the heat exchanger matrix. For example, if the heat exchanger matrix has a square cross section, the swirler may be a cross of perpendicular arms at its end, dividing the square cross section into four equal squares. Alternatively, the swirler may divide the square cross section into four equally sized triangles along the diagonals of the square.

The heat exchanger may be arranged to carry a fluid flow with a speed of greater than about 300 m/s via the conduit, and may be arranged to carry a fluid flow with a speed of greater than about 500 m/s via the conduit.

According to a second aspect of the present invention, there is provided an aircraft comprising a heat exchanger as described above in relation to any of the features or optional features of the first aspect.

According to a third aspect of the present invention there is provided a method of manufacturing a heat exchanger using additive manufacturing, the method comprising forming a swirler simultaneously with a header and arranging the swirler within the header so as to provide structural support to the header during formation.

The inclusion of the swirler within the header provides structural support to the header while it is being formed. The header is therefore prevented from collapsing during formation, for example part-way through its construction. The conduit, header and swirler may therefore be formed at the same time using additive manufacturing techniques. The heat exchanger may be formed or provided with any of the features discussed above in connection with the first aspect.

The method may comprise forming the swirler simultaneously with a conduit. The method may further comprise forming a heat exchanger matrix simultaneously with the header and/or the conduit. Alternatively the method may comprise forming the conduit, header, swirler and heat exchanger matrix in sequence.

The method may comprise using additive manufacturing to form a heat exchanger as described above in relation to any features or optional features of the first aspect.

The use of a swirler for structural support avoids the need to use any other support within the header for additive manufacturing. In this way, the invention provides an efficient manufacturing method for a heat exchanger.

BRIEF DESCRIPTION OF THE DRAWINGS

Certain example embodiments of the invention will be described in further detail below by way of example only and with reference to the accompanying drawings in which.

DETAILED DESCRIPTION

Figure 1:
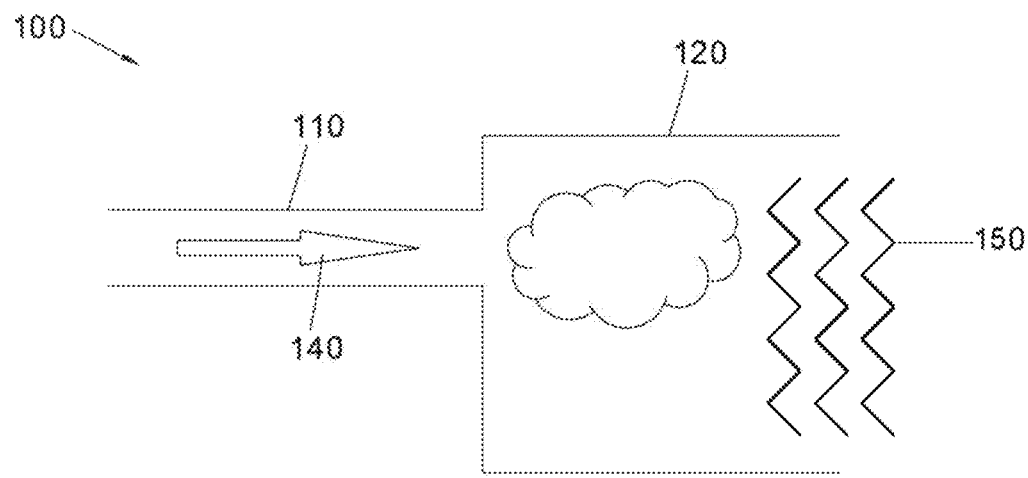
FIG. 1 shows a heat exchanger.
Figure 2:
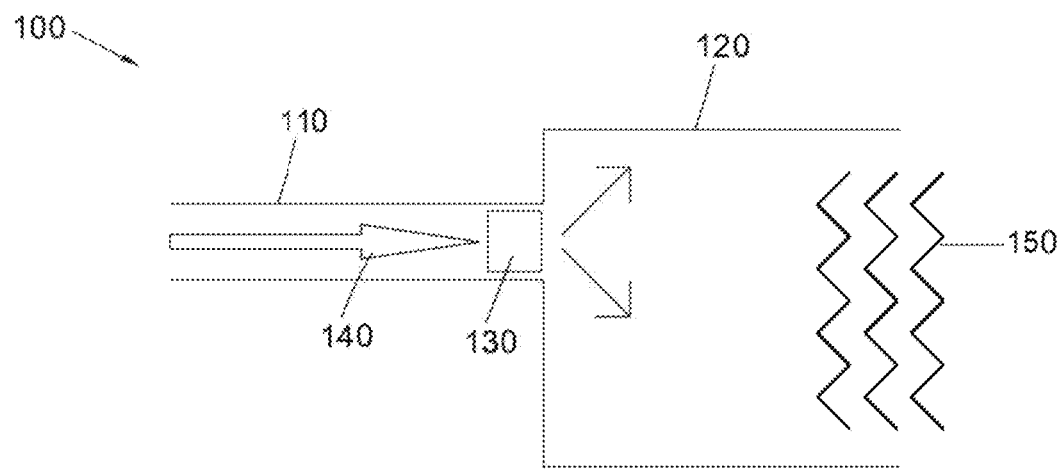
FIG. 2 shows a heat exchanger with a swirler.

FIG. 1 shows a heat exchanger 100 comprising a conduit 110, header 120 and heat exchanger matrix 150. Fluid 140 flows along the conduit 110 and into the header 120, where it disperses before entering the heat exchanger matrix 150. FIG. 2 shows a heat exchanger similar to that of FIG. 1. Fluid 140 flows along the conduit 110 at a higher speed than in the conduit 110 of FIG. 1. The fluid 140 then flows through a swirler 130 and is dispersed thereby into a volume defined by the header 120, before entering the heat exchanger matrix 150.

Figure 3A:
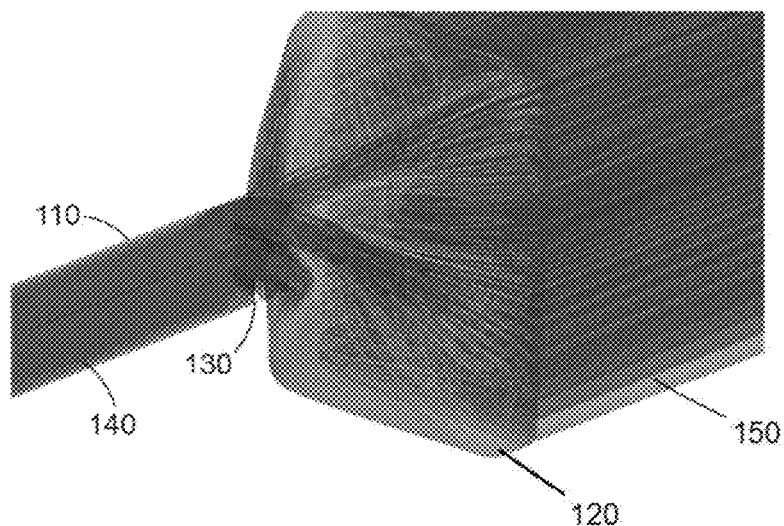
FIG. 3A shows a flow diagram of fluid with a heat exchanger with a swirler.

FIG. 3A shows the speed of a fluid flow in the heat exchanger of FIG. 2. The fluid 140 flows along the conduit 110 at speeds of more than 300 m/s, up to speeds of 500 m/s, or even 1000 m/s. The fluid 140 reaches the swirler 130 and is directed thereby into the volume of the header 120, and subsequently into the heat exchanger matrix 150. The heat exchanger matrix 150 is arranged to carry a second fluid (not shown) so as to be in heat exchange with the first fluid 140.

Figure 3B:
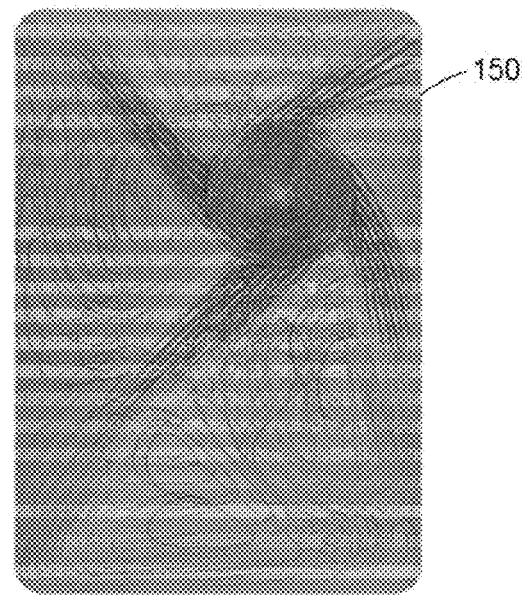
FIG. 3B shows an alternative view of the flow diagram of FIG. 3A.

FIG. 3B shows an end-on view of the heat exchanger of FIG. 3A. The heat exchanger matrix 150 defines a plurality of channels which run horizontally, substantially perpendicular to the flow path of the fluid 140 so as to maximise contact therewith. Dispersal of the fluid 140 into the volume defined by the header 120 and heat exchanger matrix 150 is indicated by the flow lines.

Figure 4:
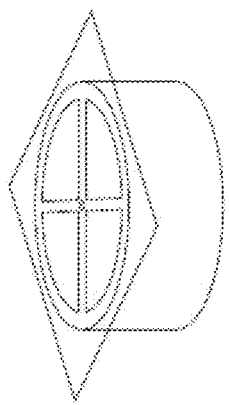
FIG. 4 shows a schematic of the manufacture of a swirler using additive manufacturing.
Figure 4:
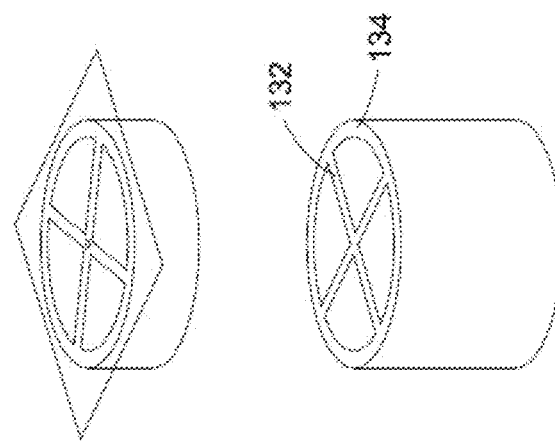
Figure 4:
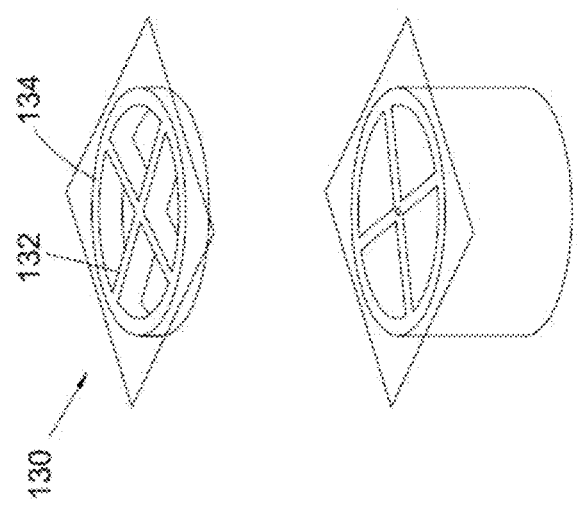

FIG. 4 shows a swirler 130 in various stages of production by an additive manufacturing process. The swirler 130 comprises four blades 132 and a sleeve portion 134 surrounding the blades. The swirler 130 is formed by the addition of incremental layers, defining the blades 132 and sleeve portion 134. The swirler 130 may be made to the desired dimensions simultaneously with a conduit of the heat exchanger.

Figure 5:
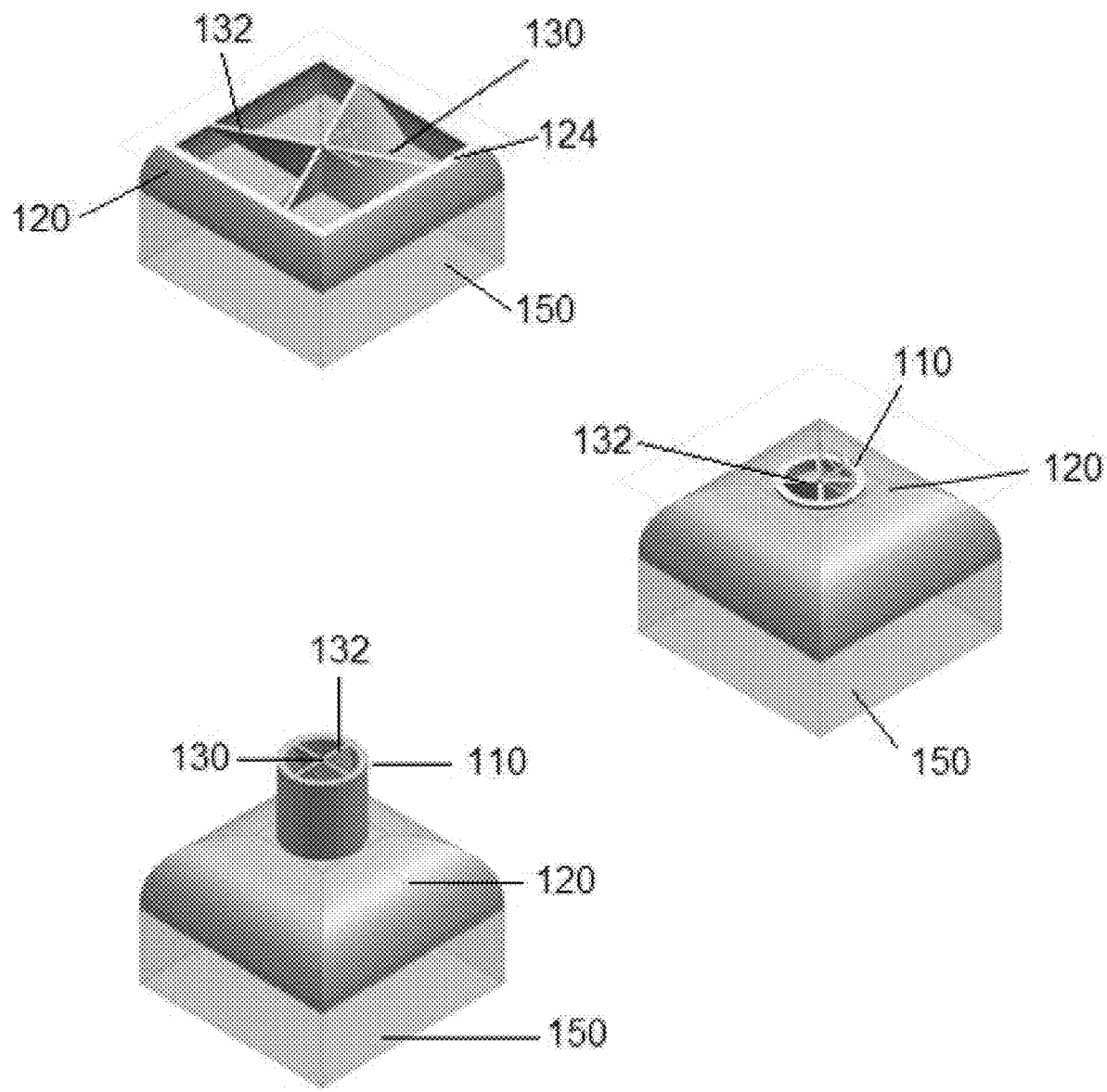
FIG. 5 shows a schematic of the manufacture of a header, swirler and conduit using additive manufacturing.

FIG. 5 shows the manufacture of the header 120, swirler 130 and conduit 110 of the heat exchanger 100 at different stages of the process. The blades 132 of the swirler 130 are formed integrally with the walls 124 of the header 120, thereby supporting the header during formation and preventing its collapse. The swirler 130 has a cross shaped cross section, which rotates relative to the header 120 as subsequent layers are added to the integral piece. Once the header 120 is formed, the process continues by the additive manufacture of the swirler 130 within the conduit 110.

The unitary piece comprising the header 120, swirler 130 and conduit 110 are shown as being formed with the header 120 and header portion of the swirler 130 first, followed by the conduit 110 and conduit portion of the swirler 130. This order of formation allows the unitary piece to be stable during manufacture, but any suitable order of manufacture may be used. The heat exchanger matrix 150 is shown in transparency in FIG. 5, and may be formed together with the conduit 110, header 120, and swirler 130 during the same additive manufacturing process.

As can be seen from FIG. 5, fluid flowing along the conduit 110 will encounter the swirler 130 and be directed by the blades 132 into the header, where it will continue to be directed by the blades 132 while dispersing, until it encounters the heat exchanger matrix 150.

Figure 6B:
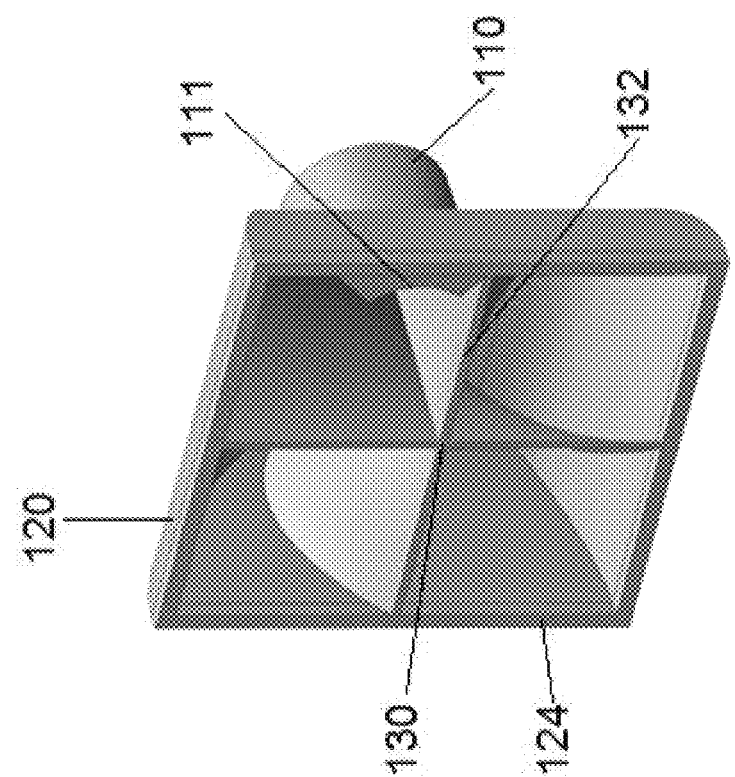
FIG. 6B shows a perspective view of the header of FIG. 6A.
Figure 6A:
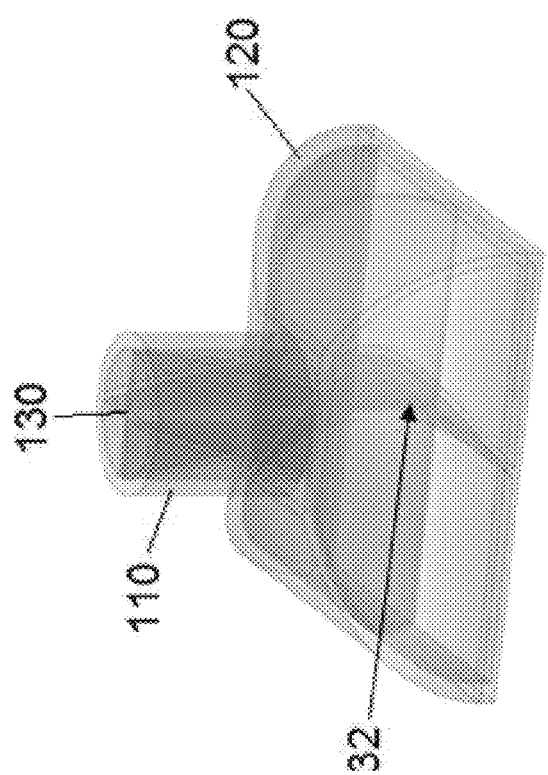
FIG. 6A shows a transparent perspective view of the header, swirler, and conduit of FIG. 5.

FIG. 6A shows a transparent view of the conduit 110 and header 120 in which the continuous curve of the blades 132 of the swirler 130 can be seen. The conduit and header 120 form an envelope about the swirler 130, which is thus formed integrally with the header 120 and the conduit 110 and is connected thereto at the edges of the blades 132. The header 120 is of course also formed integrally with the conduit 110.

The blades 132 of the swirler 130 extend the entire length of the header 120, and support all the header walls 124 at each of the surfaces of the header 120. FIG. 6B shows a perspective of the unitary header 120, swirler 130 and conduit 110 from below. A portion of the inlet 111 of the conduit 110, which defines an inlet flow path, can be seen. It can be seen in FIG. 6 that the blades 132 continue smoothly and uninterruptedly from the conduit 110 into the space within the header 120, thereby ensuring an efficient flow of fluid from the conduit.

The method and apparatus described herein and shown in the drawings provides a means of manufacturing at least a part of a heat exchanger in an efficient and simple manner using additive manufacturing. Because additive manufacturing is used, the resulting heat exchanger may be formed using only the necessary amount of material, thereby ensuring optimum weight and structural integrity of the component. While the apparatus and method herein have been shown and described with reference to exemplary embodiments, those skilled in the art will appreciate that changes and/or modifications may be made thereto without departing from the scope of the present invention as defined by the appended claims.

The invention claimed is:

1. A heat exchanger comprising:
    a conduit defining an inlet flow path for a fluid;
    a header disposed to receive a flow from the inlet flow path;
    a heat exchanger matrix disposed to receive a flow from the header; and
    a swirler disposed within the conduit and the header, wherein the swirler is arranged to disperse a flow from the inlet flow path over the heat exchanger matrix, and wherein the swirler extends over only a portion of the length of the header between the conduit and the heat exchanger matrix and thereby provides space within the header for fluid to diffuse before entering the heat exchanger matrix;
    wherein the conduit, header, and swirler have been formed as a unitary piece by additive manufacturing; and
    wherein the portion of the swirler in the header extends across the entire width of the heat exchanger matrix in two dimensions, and extends across the entire width of the header in two dimensions and joins integrally with opposing walls of the header, and is thereby arranged to provide structural support to the header during use and during formation of the header by additive manufacturing.

2. A heat exchanger as claimed in claim 1, wherein the swirler divides the header into a plurality of equal volumes.

3. A heat exchanger as claimed in claim 1, wherein the swirler comprises a plurality of curved blades arranged to direct a flow of fluid through the inlet flow path and the header.

4. A heat exchanger as claimed in claim 3, wherein the blades are smooth between the conduit and the header.

5. A heat exchanger as claimed in claim 3, wherein the swirler blades curve through 90 degrees along their entire length.

6. A heat exchanger as claimed in claim 1, wherein the swirler is arranged to complement the shape of a cross section of the heat exchanger matrix.

7. An aircraft comprising a heat exchanger as claimed in claim 1.

* * * * *